F. G. KEYES.
CRUCIBLE FOR PREPARING FUSED QUARTZ.
APPLICATION FILED JULY 1, 1913.

1,249,636.

Patented Dec. 11, 1917.

Witnesses:
Chas. F. Clagett
Thos. J. Brown

Frederick G. Keyes, Inventor
By his Attorney
George H. Stockridge

UNITED STATES PATENT OFFICE.

FREDERICK G. KEYES, OF BOSTON, MASSACHUSETTS, ASSIGNOR TO COOPER HEWITT ELECTRIC COMPANY, OF HOBOKEN, NEW JERSEY, A CORPORATION OF NEW JERSEY.

CRUCIBLE FOR PREPARING FUSED QUARTZ.

1,249,636.

Specification of Letters Patent. Patented Dec. 11, 1917.

Application filed July 1, 1913. Serial No. 776,756.

*To all whom it may concern:*

Be it known that I, FREDERICK G. KEYES, a citizen of the United States, and resident of Boston, county of Suffolk, State of Massachusetts, have invented certain new and useful Improvements in Crucibles for Preparing Fused Quartz, of which the following is a specification.

My invention relates to the art of preparing fused quartz which is used for the making of many kinds of articles, for example, for containers for mercury vapor electric apparatus. My invention covers more particularly the preparation of a crucible adapted for the fusing of this material. One of the difficulties met in the treating of very refractory substances, of which silica is only one representative, is the obtaining of crucibles suitable for withstanding the high temperatures involved and at the same time to be neutral with regard to the substances being fused or heated. It is well known that carbon or graphite resists heat in a very satisfactory manner at these high temperatures where no oxygen is present to combine with the carbon, but for many substances carbon is an undesirable material for a crucible on account of its tendency to react chemically upon them. Many substances will form carbids under the condition of high temperature when in contact with carbon.

My plan is to utilize carbon for its excellent heat resisting power, its chemical qualities, its cheapness and the facility with which it may be worked and to prevent reaction between the crucible and the charge by keeping the two out of contact as by the insertion of a tight lining between the charge and the exposed wall of the crucible. I have found that among the various materials that may be used for such a lining and which are inert with regard to various substances that may be operated upon, such as fused silica, tungsten is of great value. In virtue of its refractory nature, however, tungsten is not only expensive but difficult to manipulate and is hardly known in large thin pieces.

My invention includes, however, a method for producing a tight lining in a carbon or graphite crucible or crucible of similar material which is cheap and effective. My process and the apparatus used in this application are shown in the accompanying drawings in which—

Figure 1:
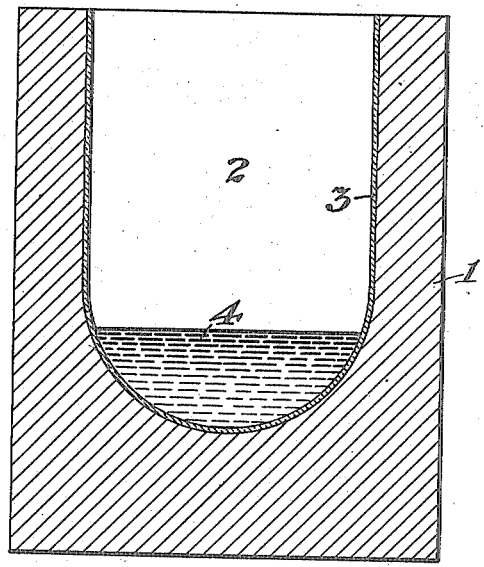
Figure 2:
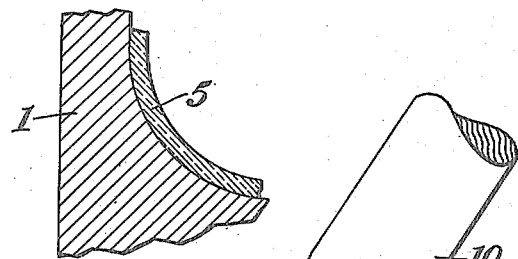

Figure 1 shows the crucible furnished with a quantity of fused material therein; Fig. 2 shows a fragment of the crucible in the initial stage of the preparation; and Fig. 3 shows the finishing stages.

In the first figure, 1 represents a hollow carbon or graphite shell or foundation so shaped as to stand firmly on a base and to hold the desired quantity of charge. 2 represents the charge chamber, 3 the tungsten lining and 4 the molten charge which may be, as already described, of silica. The lining, 3, is tight to prevent any contact between the charge and the carbon and also may be made, if desired, to have a tight hold on the surface of the material of the crucible. The process of preparation of this lining is as follows. I first make a paste or liquid mixture of some tungsten compound having a volatile element as, for example, sodium tungstate with some solvent or binder such, for example, as sodium silicate and apply this paste intimately to the surface of the crucible. This mixture contains tungsten, sodium, silica and water. This stage of the preparation is shown in Fig. 2. When the paste has become somewhat dry I heat it, gradually raising the firing higher and higher. The sodium from the sodium silicate and the sodium from the sodium tungstate is vaporized, producing a spongy or fritted mass of tungsten with a certain small amount of silicon. If this is fired sufficiently high, the residuum is refractory and inert chemically. To transform the rough, spongy surface to a smooth, closed surface, I may use a spinning tool as shown in Fig. 3 applied while the tungsten is hot in which state it is plastic and can be spun as shown in this figure. I may use for this spinning any of the usual spinning devices such, for example, as a high velocity wheel carried in bearings which can be guided or applied by hand, if desired.

Figure 3:
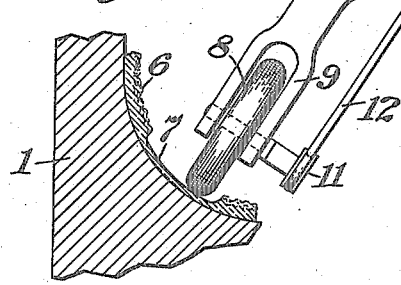

In Fig. 2, 1 is the carbon of the crucible described above and 5 is the unheated mixture of paste of sodium tungstate and sodium silicate, shown as applied on a small surface of the crucible, and in Fig. 3 which shows the crucible after the firing, 6 is the rough or fritted surface of the tungsten, 7 is a portion of the finished surface, 8 is the spinning wheel, 9 the bearings for the spinning wheel, 10 the handle, 11 a pulley on the shaft of the wheel 8, and 12 a belt for driving the pulley at a high speed. When the whole surface has been gone over like the surface 7 of Fig. 3, the crucible is complete and ready for use.

It is well oftentimes in carrying out the heating or igniting of the crucible and the paste to keep the crucible in a reducing atmosphere, as for example an atmosphere of hydrogen to prevent the injurious effect of oxygen.

I have described tungsten as a material for the lining of my crucible but do not wish to be limited to this material for there are other refractory chemically inert elemental metals very well adapted for certain uses of my apparatus. Neither do I wish to limit myself to carbon for other refractory material which needs a lining or any material which may be substituted therefor falls within the scope of the present invention. Neither do I wish to limit myself to the interior lining of a pocket as shown, but include within my invention the covering of any surface with elemental tungsten or equivalent material where protection is required from some exposure. One salient character of my invention resides in the lining or covering and the method of producing the lining or covering as set forth herein.

I may state that since the co-efficient of expansion of metallic tungsten is 0.0000035 and that that of graphite is of the same order of magnitude, that the lining in the crucible will not be unduly strained by expansion and contraction. I would recommend a temperature of a thousand degrees centigrade or higher for the spinning of the tungsten.

I claim as my invention:

1. A carbon crucible with a tungsten lining.
2. A carbon crucible with a spongy tungsten lining.
3. A carbon crucible with a lining of refractory metal.
4. A carbon crucible with a lining of refractory metal inert to fused quartz.
5. A crucible of refractory material with a lining of refractory metal inert to fused quartz.
6. A crucible of refractory material with a lining of refractory metal.
7. An article of manufacture, comprising a surface of refractory material and a covering of refractory metal.
8. An article of manufacture, comprising a surface of refractory material and a covering of tungsten.
9. A crucible having an inner surface of tungsten.

Signed at New York, in the county of New York and State of New York this 27th day of June A. D. 1913.

FREDERICK G. KEYES.

Witnesses:
Wm. H. Capel,
Thos. H. Brown.